(12) United States Patent
Catherwood et al.

(10) Patent No.: US 9,619,231 B2
(45) Date of Patent: Apr. 11, 2017

(54) PROGRAMMABLE CPU REGISTER HARDWARE CONTEXT SWAP MECHANISM

(71) Applicant: Microchip Technology Incorporated, Chandler, AZ (US)

(72) Inventors: Michael I. Catherwood, Georgetown, TX (US); Bryan Kris, Gilbert, AZ (US); David Mickey, Chandler, AZ (US); Joseph Kanellopoulos, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 389 days.

(21) Appl. No.: 14/200,417

(22) Filed: Mar. 7, 2014

(65) Prior Publication Data

US 2015/0019847 A1 Jan. 15, 2015

Related U.S. Application Data

(60) Provisional application No. 61/777,887, filed on Mar. 12, 2013.

(51) Int. Cl.
| | | |
|---|---|---|
| *G06F 9/30* | (2006.01) | |
| *G06F 9/46* | (2006.01) | |
| *G06F 9/38* | (2006.01) | |

(52) U.S. Cl.
CPC ........ *G06F 9/30145* (2013.01); *G06F 9/3009* (2013.01); *G06F 9/3865* (2013.01); *G06F 9/462* (2013.01)

(58) Field of Classification Search
CPC .. G06F 9/30145; G06F 9/3009; G06F 9/3865; G06F 9/462; G06F 9/30132; G06F 9/3861
See application file for complete search history.

(56) References Cited

U.S. PATENT DOCUMENTS

| | | | | |
|---|---|---|---|---|
| 3,825,902 | A * | 7/1974 | Brown | ..................... G06F 9/461 710/264 |
| 5,640,582 | A * | 6/1997 | Hays | ..................... G06F 9/3004 712/202 |
| 2006/0101252 | A1* | 5/2006 | Tomisawa | ............... G06F 9/462 712/228 |
| 2008/0307208 | A1 | 12/2008 | James et al. | ................... 712/228 |
| 2010/0262805 | A1 | 10/2010 | Justice et al. | .................... 712/37 |
| 2010/0299471 | A1 | 11/2010 | Shrivastava et al. | ......... 710/266 |

OTHER PUBLICATIONS

International Search Report and Written Opinion, Application No. PCT/US2014/022056, 12 pages, Jun. 4, 2014.

* cited by examiner

*Primary Examiner* — Benjamin Geib
(74) *Attorney, Agent, or Firm* — Slayden Grubert Beard PLLC

(57) ABSTRACT

A central processing unit (CPU) having an interrupt unit for interrupting execution of instructions, a plurality context defining register sets, wherein each set of registers having the same number of CPU registers, a switching unit for coupling a selected register set within the CPU, wherein the switching unit switches to a predetermined register set of the plurality of context defining register sets upon occurrence of an exception, and a control register configured to control selection of a register set of the plurality of context defining register initiated by an instruction and further operable to indicate a currently used context.

27 Claims, 7 Drawing Sheets

CTXTSWP     CPU Register Context Swap Literal

Syntax:     {label:} CTXTSWP    lit3

Operands:    lit3 ∈ [0 ... 4] (see note 2)
Operation:    IF context defined by lit3 is valid
                THEN switch CPU register context to context defined by lit3
                ELSE execute as 2 cycle NOP
Status Affected:   None

Encoding:

| 1111 | 1110 | 1110 | UUUU | UUUU | Ukkk |
|------|------|------|------|------|------|

Description:    This instruction will force a CPU register context switch (W0 through W14) from the current context to the target context defined by value lit3. If the specified context is not implemented on the device, this instruction will execute as a 2 cycle NOP.

A successful context switch will update the Current Context Identifier and the Manual Context Identifier (held in CTXTSTAT.CCTXI[2:0] and CTXTSTAT.MCTXI[2:0] respectively) to reflect the new active CPU register context.

> Note 1: The SR is not included in the additional CPU register context (see Section 4.25.2.1).
> 2: It is expected that design timing constraints will limit the maximum number of additional contexts to 4.

Words:    1
Cycles:    2

*Figure 5A*

CTXTSWPW CPU Register Context Swap Wn

Syntax:          {label:}        CTXTSWP        Wn

Operands:        Wn ∈ [W0 ... W15]
Operation:       IF context defined by the contents of Wn[2:0] is valid
                 THEN switch CPU register context to context defined by the contents of Wn[2:0]
                 ELSE execute as 2 cycle NOP
Status Affected: None Encoding: | 1111 | 1110 | 1111 | UUUU | UUUU | ssss |

Description:     This instruction will force a CPU register context switch (W0 through W14) from the current context to the target context defined by value lit3. If the specified context is not implemented on the device, this instruction will execute as a 2 cycle NOP.

A successful context switch will update the Current Context Identifier and the Manual Context Identifier (held in CTXTSTAT.CCTXI[2:0] and CTXTSTAT.MCTXI[2:0] respectively) to reflect the new active CPU register context.
        Note 1: The SR is not included in the additional CPU register context (see Section 4.25.2.1).
        2: It is expected that design timing constraints will limit the maximum number of additional contexts to 4.

Words:           1
Cycles:          2

*Figure 5B*

| 15 14 | 12 11 | 10 8 | 7 6 | 4 3 | 2 0 |
|---|---|---|---|---|---|
| FALTREG[15:0]¹ U | CTXT4[2:0] | U CTXT3[2:0] | U | CTXT2[2:0] U | CTXT1[2:0] |

*Figure 6*

PROGRAMMABLE CPU REGISTER HARDWARE CONTEXT SWAP MECHANISM

CROSS-REFERENCE TO RELATED APPLICATIONS

This application claims the benefit of U.S. Provisional Application No. 61/777,887 filed on Mar. 12, 2013, which is incorporated herein in its entirety.

TECHNICAL FIELD

The present disclosure relates to central processing unit (CPU), in particular CPUs used in microprocessor or microcontrollers.

BACKGROUND

Most CPUs provide for an interrupt function that interrupts a current instruction execution to execute a so-called interrupt routine. Switching from a current execution into such an exception or interrupt routine causes often a latency associated with interrupt context switching which in certain CPU's can for example be up to 28 CPU cycles long. Thus, there exists a need for an improved handling of interrupts.

SUMMARY

According to an embodiment, a central processing unit (CPU) may comprise an interrupt unit for interrupting execution of instructions; a plurality context defining register sets, wherein each set of registers having the same number of CPU registers; a switching unit for coupling a selected register set within the CPU, wherein the switching unit switches to a predetermined register set of the plurality of context defining register sets upon occurrence of an exception; and a control register configured to control selection of a register set of the plurality of context defining register initiated by an instruction and further operable to indicate a currently used context.

According to a further embodiment, the control register may comprise a first bitfield indicating a current context and a second bitfield indicating a most recent context selected by the instruction. According to a further embodiment, the CPU can be operable to execute an instruction for initiating a context switch. According to a further embodiment, the instruction can be a dedicated context swap instruction. According to a further embodiment, the control register can be only readable. According to a further embodiment, the control register can be readable and at least partially writable and the instruction is a move data instruction that is applied to the control register for changing the content of the control register to initiate a context switch. According to a further embodiment, the interrupt unit may comprise an interrupt controller operable to assign a plurality of priority levels to a plurality of interrupt sources. According to a further embodiment, each of the plurality of register sets can be assignable to an interrupt level such that upon occurrence of an interrupt a respective register set of the plurality of context defining register sets is selected by the switching unit depending on the interrupt level. According to a further embodiment, an unassigned interrupt level may default to a default register set of the plurality of context defining register sets. According to a further embodiment, upon occurrence of an interrupt with an unassigned interrupt level, no context switch will be initiated. According to a further embodiment, if a register set is assigned to a priority level which has already been assigned to another register set, then the CPU may be operable to assign the register set with a lowest number to the selected priority level and unassign the respective other register set. According to a further embodiment, the CPU may further comprise a fuse field for assigning the interrupt levels to one of the plurality of register sets. According to a further embodiment, the control register can be updated with a new context after a context switch has been performed.

According to another embodiment, a method for performing a context switch in a central processing unit (CPU) comprising a plurality context defining register sets, wherein each set of registers having the same number of CPU registers may comprise the steps: upon occurrence of an exception automatically switching to a predetermined register set of the plurality of context defining register sets, wherein selection of a register set of the plurality of context defining register can further be manually initiated by executing an instruction; and indicating a currently used context in a context control register.

According to a further embodiment of the method, the context control register may comprise a first bitfield indicating a current context and a second bitfield indicating a most recent context selected by the instruction. According to a further embodiment of the method, the method may further comprise executing an instruction for initiating a context switch. According to a further embodiment of the method, the instruction can be a dedicated context swap instruction. According to a further embodiment of the method, the control register may only be readable. According to a further embodiment of the method, the control register may be readable and at least partially writable and the instruction is a move data instruction that is applied to the context control register for changing the content of the context control register to initiate a context switch. According to a further embodiment of the method, the method may further comprise assigning a plurality of priority levels to a plurality of interrupt sources. According to a further embodiment of the method, each of the plurality of register sets may be assignable to an interrupt level such that upon occurrence of an interrupt a respective register set of the plurality of context defining register sets is selected by the switching unit depending on the interrupt level. According to a further embodiment of the method, an unassigned interrupt level may default to a default register set of the plurality of context defining register sets. According to a further embodiment of the method, upon occurrence of an interrupt with an unassigned interrupt level, no context switch may be initiated. According to a further embodiment of the method, if a register set is assigned to a priority level which has already been assigned to another register set, then the CPU can be operable to assign the register set with a lowest number to the selected priority level and unassign the respective other register set. According to a further embodiment of the method, the method may further comprise providing a fuse field for assigning the interrupt levels to one of the plurality of register sets. According to a further embodiment of the method, the method may further comprise updating the context control register with a new context after a context switch has been performed.

BRIEF DESCRIPTION OF THE DRAWINGS

FIGS. 5A and 5B show embodiments of a special function instruction;

FIG. 6 shows an example of a fuse field;

DETAILED DESCRIPTION

Figures 1, 2:
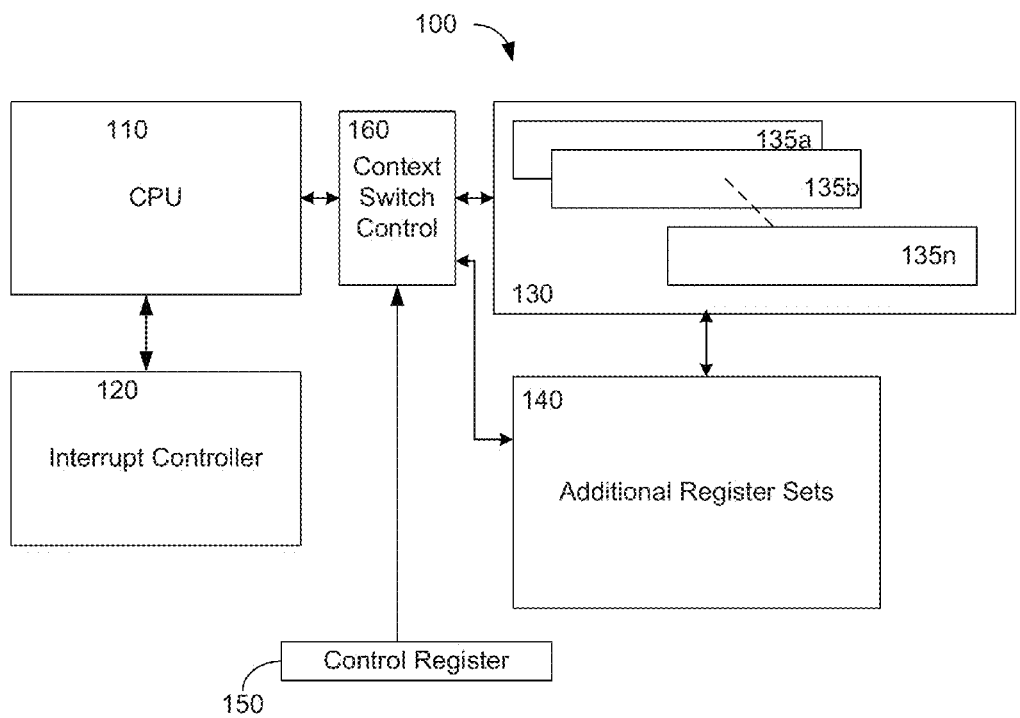
FIG. 1 shows a block diagram of an embodiment.
FIG. 2 shows an embodiment of a context status register.

During execution of a main instruction sequence (main program), a context is defined by a predefined number of CPU registers. CPU registers are defined as those registers within the CPU that generally form a register file or set of registers coupled with the arithmetic logic unit and other processing logic and used by the instructions as primary sources or destinations to perform basic data and address processing. Thus, general purpose memory and other special function registers controlling functions of peripherals are generally not considered to be part of a current context unless they fit the above description. Some embodiments of microprocessors or microcontrollers use a register file formed by a memory bank wherein all special function registers are memory mapped to the data memory. Once a memory bank is selected, all memory locations within a memory bank form general purpose or special function registers which can define a context. However, in such implementations usually, only a subset of registers is considered as a context. Other embodiments, use a dedicated number of CPU registers, for example 16 or 32 registers that are not part of the data memory and used as the primary source and/or destination of CPU instructions. Some or all of these registers may also be memory-mapped to the data memory.

Exceptions such as interrupts occur asynchronously and therefore their occurrence cannot be predicted. Subroutines are generally executed synchronously, in other words, it is exactly known where in the main program a subroutine call will be executed. Generally, the content of the context defining registers should not be altered during the execution of an exception to allow undisturbed execution of the main program once the exception has been executed. Otherwise unpredictable behavior of the CPU could occur. The same may also be true for the execution of subroutines. Thus, the context needs to be saved prior to the execution of a service routine or in some cases of a subroutine and restored before the CPU returns to the execution of the main instruction sequence.

According to various embodiments, a programmable CPU register hardware context swap mechanism can be provided. The present disclosure distinguishes between an automatic and a manual context switch. The term "automatic" refers here to the fact that the context swap is initiated automatically without the requirement to execute any dedicated instruction. In other words, an interrupt signal causes not only the exception but also the context switch. On the contrary a "manual context switch" is initiated by a dedicated instruction or the setting of one or more specific bits in a control register. Thus, a "manual" context switch is initiated by one or more instructions executed by the CPU. However, the actual context switch is performed without the requirement of executing any instructions contrary to a traditional saving/restoring of registers by means of an instruction sequence. Thus, in both methods a zero overhead context switch is performed. Zero overhead is to be understood as not requiring additional time to perform the context switch. Thus, for example during an "automatic" context switch, the context switch is performed during the transition time necessary to branch to the interrupt service routine. In a "manual" switch, the context switch only needs the time necessary to execute the respective instruction. In some embodiments, such an instruction may have an execution time long enough to perform the actual switch. This may depend on the hardware and therefore in some embodiments, such an instruction may not be executed as fast as other instructions.

According to some embodiments, a dedicated CPU instruction, for example an instruction encoded with the mnemonic "CTXTSWP(W)" can be provided, that allows users to swap between CPU register contexts using software. Various embodiments may be designed to also operate with hardware, for example interrupt based context switching.

According to some embodiments, CPU register contexts are tied to interrupt priority levels and therefore user programmable. Register context are transparently switched during exception processing when selected interrupts are triggered and the context is transparently recovered during ISR return. No additional program steps to be provided by a user program are needed. Thus, an automatic save of the current context without the need of saving register contents by individual instructions is performed. All latency associated with interrupt context switching is thus removed which for example, can save up to 28 CPU cycles or more in certain embodiments, for example certain conventional microcontrollers.

In applications that have frequent high priority interrupts which contain very little active code, context swapping latency dominates the total execution time, limiting the respective device throughput. According to various embodiments, an effective boost in performance can be provided without the need for a faster device clock speed. Thus, according to various embodiments, a means is provided to initialize contexts prior to use by hardware (interrupt based) context switching, or for a device emulation system to view/change contexts during debugging. Also, the assignment of a specific context to a priority level allows to choose no context switch for certain priority levels that have interrupt service routines that do not change the context or affect only registers that are unused in the main program.

Thus, the various embodiments, allow contexts to be initialized (typically prior to use as hardware interrupt contexts), enable a debugger to read/write to contexts within a Debug mode, and allow the code to use contexts not assigned for use with interrupts to accelerate entry and exit to procedure or library calls. As mentioned above in certain processors up to 28 cycles of overhead can be saved and context data persistence can be offered. This feature removes the need to save/restore local variables if the context is dedicated.

According to many conventional processors a context may need to be initialized or viewed, and/or could need to be swapped using software. This leads to the ability for interrupt returns to be able to discriminate between hardware and software controlled context switching (to support arbitrary interrupt nesting).

According to some embodiments, for example in a digital signal controller according to the dsPIC33 family of microcontrollers manufactured by Applicant, up to 4 additional CPU register contexts (W0 through W14) can be provided. According to some embodiments, this can be done by adding 4 sets of shadow registers as will be explained in more detail below. Also, according to other embodiments, more or less contexts can be provided. A stack pointer (W15) and all other CPU registers may remain common to all contexts. Contexts may be swapped through hardware or software according to various embodiments.

In a hardware context swap, contexts are assigned, for example by means of fuses, to an Interrupt Priority Level (IPL) and transparently swapped during exception processing. This can be performed with zero overhead by automatically swapping the content of the current context with the content of the context stored in associated shadow registers.

In a software context swap, contexts are transparently swapped using a return from interrupt (RETFIE) instruction. Again, this instruction causes a context swap with zero overhead as the instruction needs to be executed no matter what to exit the service routine and return to the main program. According to some embodiments, contexts can also be manually swapped using a dedicated CPU instruction, for example an instruction using the mnemonic "CTXTSWP(W)." Contexts are persistent, i.e. they are preserved when swapped out of. Only the current active context may be memory mapped into a special function register space in the data memory according to some embodiments. Thus, the currently active context can be manipulated whereas the inactive contexts cannot be altered.

For applications which have short but frequently called interrupt service routines (ISRs), e.g. switched mode power supply (SMPS) applications, interrupt entry/exit overhead has become a limiting performance factor. Saving/restoring CPU registers can account for up to 30% of the total ISR execution time. Transparent context swapping based on an interrupt priority level (IPL) permits higher performance at the same clock speed (or lower power to maintain the same throughput).

According to various embodiments, a cost effective CPU Context Swap solution can be provided which is:
  able to significantly improve device performance by having zero or low overhead;
  simple to understand and use by introducing no new data hazards and working with nested interrupts;
  manageable from a device timing perspective;
  easily integrated into existing Dev Tools; and
  fully backwards compatible.

FIG. 1 shows a block diagram of a microprocessor or microcontroller according to an embodiment. A central processing unit (CPU) 110 is shown which is connected with an interrupt controller 120 that may be designed to control/manage a plurality of internal and/or external interrupt sources. FIG. 1 further depicts a default context 130 comprising registers 135a . . . n and additional register sets 140 coupled through a context switch control unit 160 with CPU 160. Generally, a central processing unit is considered to consist of one or more registers, control logic, arithmetic logic unit, instruction decoder, program counter, and various input/output interface. While FIG. 1 shows the CPU 110 as a separate block, it is to be understood some or all of the elements shown in FIG. 1 may be considered to be part of the actual CPU.

As mentioned above a context may be defined by the content of a plurality of predefined registers. For example, FIG. 1 shows a context 130 including registers 135a . . . 135n. The number of registers included in a context may vary upon processor design. In certain processor designs only a minimum of registers define an actual context. Thus, only a subset of registers available to the processor define the context. If a user manipulates other registers during executing of a subroutine or interrupt service routine, the user must make sure that respective other registers are saved by means of respective load and store instructions. However, other embodiments may include all available CPU registers to define a context. FIG. 1 shows in addition a memory block 140 that is used to provide a plurality of additional register sets. Each additional register set is capable of storing the entire content of a context. In other words, each additional register set has as many registers as the current context. For example, as shown in FIG. 1, each additional register set has n registers. The additional registers sets 140 may be implemented in a dedicated memory space. According to one embodiment, four additional sets of context registers may be implemented. Thus, blocks 130 and 140 provide for five different contexts. A context switch means a switch from a current set of registers, which can be in block 130 or 140, to one of other non-active four register sets. Thus, the respective context content remains unaltered upon a switch. According to some embodiments, only the active context is also memory mapped to the data memory. Thus, the currently active context can be also accessed through the data memory.

FIG. 1 shows context switch control unit 160 which is controlled by a control register 150 to select one of the contexts, for example the default context 130 or one of the register sets in the additional register set block 140. Furthermore, interrupt controller 120 handles all internal and/or external interrupts and may also be considered to be part of the actual CPU. Interrupt controller may provide CPU 110 with one or more interrupt signals to generate interrupts with different priority levels. According to an embodiment, each priority level may be assigned to a specific register set, the default register set 130 or one of the additional register sets 140. Thus, whenever an interrupt occurs, switching unit 160 is controlled to automatically select an associated context register set. In addition, the CPU may have a dedicated instruction that causes a so-called manual context switch or may allow to write into control register 150 to perform the manual context switch.

FIG. 2 shows an example of control register 150 in form of a context status register. According to some embodiments, such a register may only be readable. Register 150 may provide for two separate bitfields CCTX[2:0] and MCTX[2:0]. Each bitfield according to an embodiment has three bits allowing for defining up to 8 different contexts. More or less bits may be used depending on the number of implemented context register sets. Bitfield CCTX[2:0] indicates the currently selected context whereas bitfield MCTX[2:0] indicates the last context that has been set manually. Thus, depending on the current status of the CPU, the content of these bitfields may differ. Bitfield CCTX[2:0] is updated whenever a context switch occurs whether initiated automatically or manually. Bitfield MCTX[2:0] is only updated during a manual context switch when a respective instruction for switching a context is executed.

Figure 3:
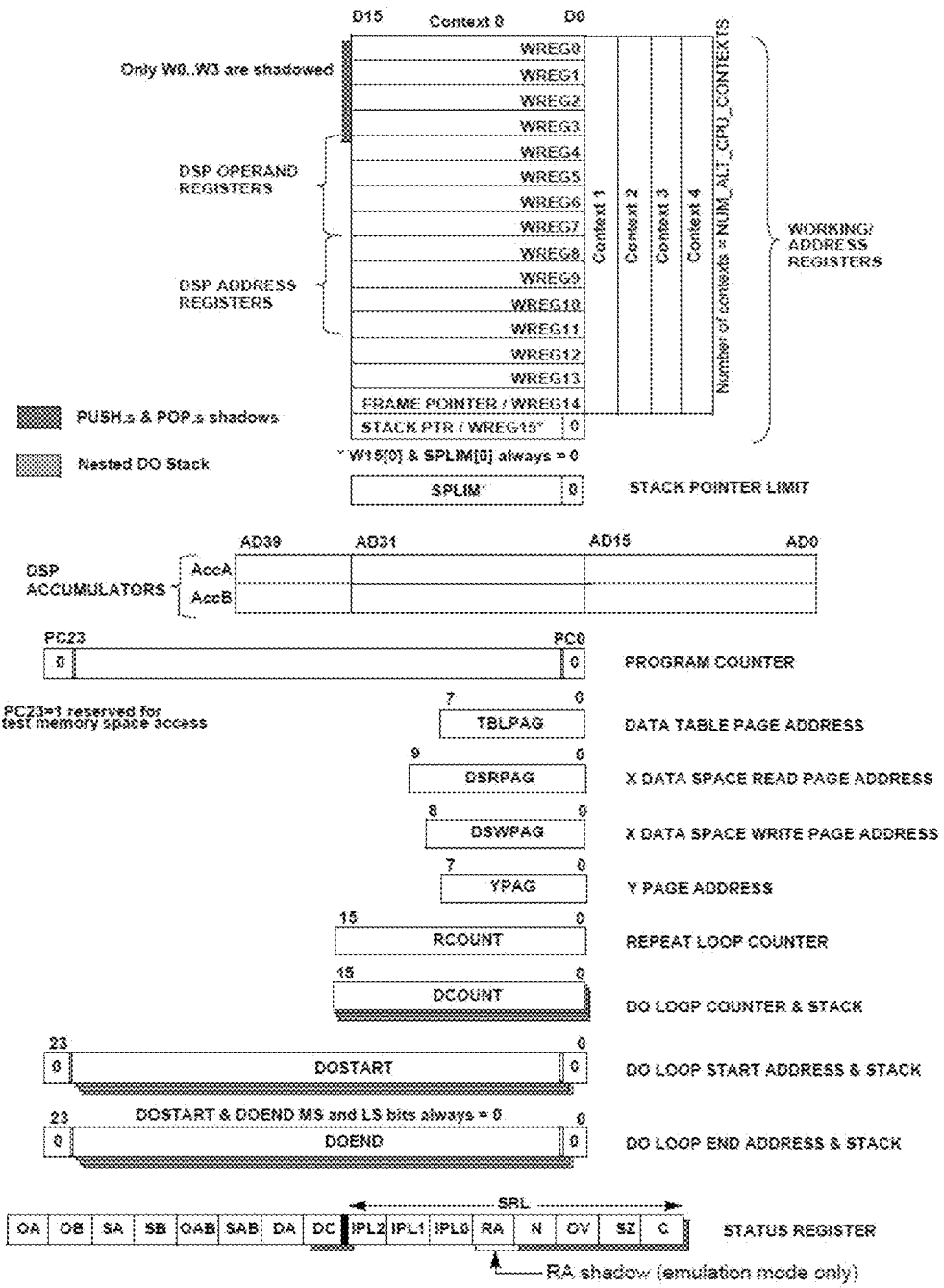
FIG. 3 shows another block diagram depicting an embodiment of a CPU.

FIG. 3 shows a more detailed block diagram of typical 16 bit microcontroller. However, the concept according to various embodiments can be implemented in higher or lower microprocessor or microcontrollers. The embodiment of the CPU shown in FIG. 3 is of a mixed signal microcontroller having conventional microcontroller elements and digital signal controller capabilities. Thus, the block diagram of the CPU shows various registers that are not considered part of the context. Here, the context is formed by working registers WREG0 . . . WREG14. In addition, four context block, each including 15 registers for forming a context, are provided. WREG 15 is the stack pointer and like the status register not considered part of a context. As can be seen certain registers may be used for both operating modes of this device, i.e. when operating as a microcontroller or as a digital signal controller.

Figure 4:
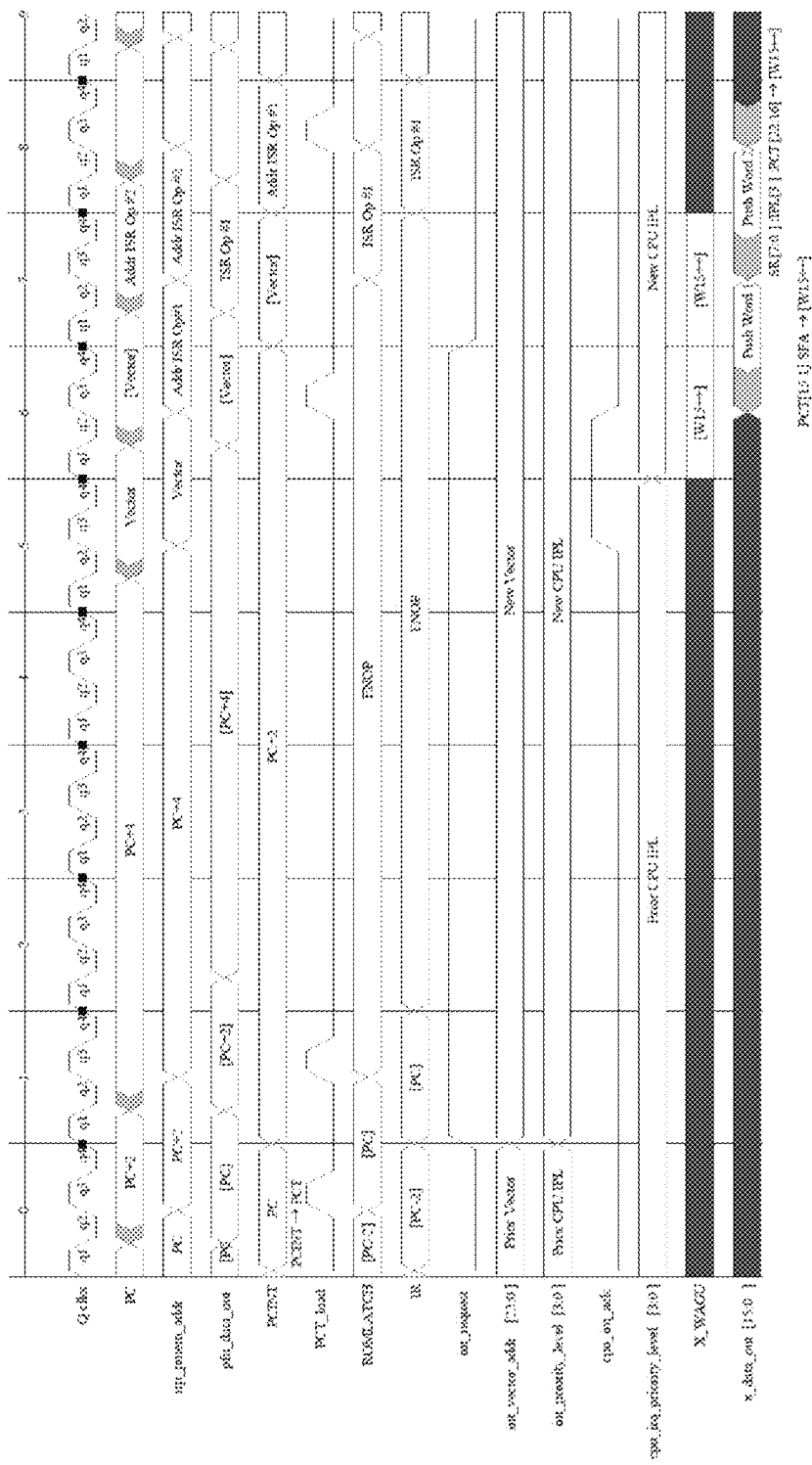
FIG. 4 shows a timing diagram according to an embodiment.

FIG. 4 shows that contexts may be associated with an interrupt priority level, for example using programmable fuses. However, control register can be used to dynamically associate the various shadow register sets with an interrupt priority level. On top of the timing diagram in FIG. 4, the sequential cycles are indicated. At the beginning of cycle 1, an exception processing starts by asserting the interrupt request signal int_request. During cycle 1 the old or current context is still active so the currently executed instruction still may use the proper context. During the same time it is checked whether the current interrupt priority level is associated with a new context. During cycle 2, if necessary the context is switched to a new context according to the interrupt priority level. As can also be seen during cycle 2 and 3 which insert no-operation instructions, the content of register WREG15 is pushed to the stack. Executing of the first instruction of the interrupt service routine occurs in cycle 4.

According to some embodiments, contexts may be manually swapped using an instruction. This provides a means to use contexts outside of interrupts (e.g. library calls), wherein only contexts not assigned to IPLs should be used. Furthermore, this provides for a means to initialize contexts prior to use by exception processing, wherein interrupts should be disabled. Also, this provides for context observability and controllability for development tools, such as in in circuit emulators or debuggers (and test, though it's all scan now). Instructions MCTXI and CCTXI can be updated during CTXTSWP(W) execution according to various embodiments.

FIGS. 5a and 5b show an example of possible context swap instructions which specify the target context using a literal or a value held in a working register W.

In addition, a return from interrupt instruction RETFIE selectively returns to the appropriate context:
IF
Unstacked IPL is associated with a context, swap to that context
ELSE
Return to manual swap context identified in MCTXI register.

This approach, in conjunction with exception processing operation, ensures context coherency when nesting exceptions and/or calls where contexts are switched both automatically and manually. A manual context switch according to some embodiments requires source code to be executed to provide for the respective function, for example, in the disclosed embodiments above one instruction must be executed by the CPU to force a context switch. An automatic context switch does not require any code to be executed to cause the actual switch because the context switch is performed automatically on occurrence of an interrupt. In either case, the control register is updated showing the respectively selected context, once the switch has been performed.

The following describes a specific implementation according to one embodiment as shown in FIG. 3 using the architecture of a dsPIC33 family microcontroller manufactured by Applicant. In addition to default Context 0, up to 4 CPU register contexts (Context 1 through 4) may be instantiated into the CPU core, based on the value of the parameter NUM_ALT_CPU_CONTEXTS. If NUM_ALT_CPU_CONTEXTS=0, only Context 0 exists within the device. Each additional context consists of WREG0 through WREG14 and is persistent. That is, the contents of each context do not change whenever the CPU leaves that context. Registers WREG0 through WREG14 within all contexts are cleared during reset, and the uninitialized register reset also applies to any active context. No other CPU registers are included within the additional contexts. The PUSH/POP.s instructions may be executed in any context. Contexts may be switched through hardware (automatic) or by using software (manual):

Hardware context switching is automatic and transparent to the user. When a context is associated with a specific Interrupt Priority Level (IPL), the context is entered during exception processing of any interrupt at that level. The context is exited during execution of RETFIE instruction of the interrupt ISR. Hardware context switching invokes no additional overhead.

Software context switching is under user control using a CTXTSWP(W) instruction. According to an embodiment, execution of the instruction is conditional upon satisfying a software interlock.

According to an embodiment, the Context Status register (CTXTSTAT) is a read only register located at address 0x005A that contains the Current Context Identifier (CCTXI[2:0]) and Manual Context Identifier (MCTXI[2:0]) status fields. The CCTXI[2:0] field indicates to the user which CPU W-register context is current in use. This field is updated whenever the W-register context is changed, either through automatic interrupt based hardware switching, or as the result of a context change brought about by the execution of a CTXTSWP(W) instruction. The MCTXI[2:0] field indicates to the user which CPU W-register context was most recently selected as the result of a context change brought about by the execution of a CTXTSWP(W) instruction. The MCTXI[2:0] field is used by the RETFIE instruction to track manual (software) context switches in the absence of any automatic interrupt based context switching.

Each additional context is associated with a CPU Interrupt Priority Level (IPL) defined by the value in a 3-bit fuse (CTXTn[2:0]) field within the FALTREF fuse. The fuse bit fields are allocated to each context as shown in Table 1 and FIG. 6.

TABLE 1

| CTXTn Fuse Field | |
|---|---|
| Assigned IPL | CTXTn[2:0] |
| None | 3'b111 |
| 7 | 3'b110 |
| 6 | 3'b101 |
| 5 | 3'b100 |
| 4 | 3'b011 |
| 3 | 3'b010 |
| 2 | 3'b001 |
| 1 | 3'b000 |

According to some embodiments, context switching for traps may not be supported. When the CTXTn[2:0] fuse field is erased (CTXTn[2:0]=3'b111), no IPL is associated with the corresponding context.

Note that the 3-bit value programmed into the CTXTn fuse field is (IPL−1) in order to ensure no alternative contexts are allocated when the FALTREG fuse is erased. For example, to associate Context 1 with IPL 6, the user would program 3'b101 into CTXT1[2:0]. All IPL levels not assigned to an additional context will always use the current context (i.e. the context will not change). Alternatively according to some embodiments, unassigned IPL level may be automatically assigned to a default context, for example the first context defining register set.

If a user inadvertently assigned more than 1 additional context to the same IPL, hardware in the CPU will prioritize the assignment such that the context with the lowest number is used (e.g. if CTXT1=CTXT2=3'b110, Context 1 will be assigned to IPL7 and Context 2 will be unassigned). Although this scenario is considered erroneous (and therefore not recommended), the unused (unassigned) context will remain available for software context switching use. During exception processing, the CPU will compare the CTXTn fields with the IPL that the CPU is responding to (i.e. in the process of moving to). If there is a match, the CPU will switch to the selected context transparently during exception processing. If there is not a match, the CPU will continue to use the current context. The new (or existing) context will be immediately available at the start of the associated ISR. Exception processing stacks the return IPL (as normal). The currently active context is indicated in the CTXTSTAT register in the Current Context Identifier field (CTXTSTAT.CCTXI[2:0]). This register is updated whenever the CPU switches to another context. During execution of a RETFIE instruction, the return IPL is un-stacked as normal (together with the return PC and remaining SRL bits), and compared to IPLs assigned to alternative contexts. If a match is found, RETFIE will switch back to the assigned context. If no match is found, RETFIE will switch to the context defined in the Manual Context Identifier status register (CTXTSTAT.MCTXI[2:0]). Switching to the manual context held in MCTXI[2:0] permits the use of both software and interrupt based context switching with the application code. The CPU will transparently switch to the selected context (if necessary) during RETFIE execution. The new (or existing) context will be immediately available at the start of execution of the next instruction, and CTXTSTAT.CCTXI[2:0] will be updated accordingly.

Figure 7:
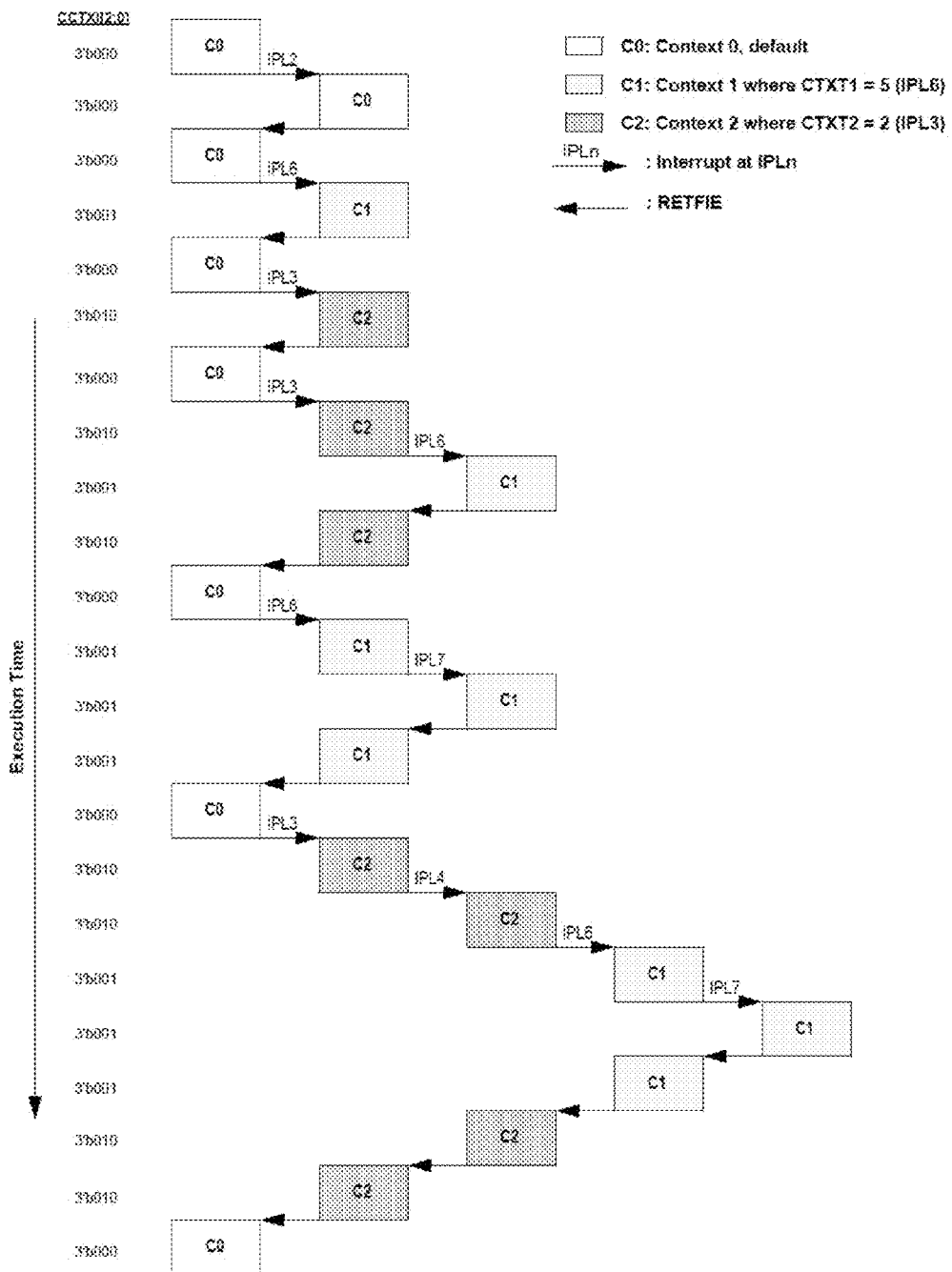
FIG. 7 shows a flow chart depicting exemplary exception processing.

A code flow example (without software context switching) for a device that supports 2 additional CPU contexts is shown in FIG. 7. Context 1 (C1) is assigned to IPL6, and Context 2 (C2) is assigned to IPL3.

When a context is not assigned to an IPL, or the interrupts associated with that IPL are disabled, the user may choose to switch contexts through software by executing one of the CTXTSWP(W) instructions (which will not affect the CPU IPL). The CTXTSWP(W) instructions can be a sub-decode of the PWRSAV opcode according to one embodiment. The CTXTSWP instruction uses a literal value to determine the target context. The CTXTSWPW instruction uses register direct addressing where the target context is defined in the LSBs of a W register. Execution of the CTXTSWP(W) instructions can be subject to a software interlock according to a specific embodiment. When successfully executed, the instruction will switch to the context defined by the instruction operand in two cycles and update both the Manual Context Identifier (CTXTSTAT.MCTXI[2:0]) and the Current Context Identifier (CTXTSTAT.CCTXI[2:0]) register field with the new context value. The new context will be immediately available at the start of execution of the next instruction (i.e. without a hazard). The instruction will be disabled and execute as a 2 cycle FNOP with no error being reported (i.e. have no effect) should a user attempt to:

Switch to a context that is not supported
OR
Switch to the currently active context
OR
Execute the instruction on a device that does not support additional contexts (i.e. NUM_ALT_CPU_CONTEXTS=0)

Figure 8:
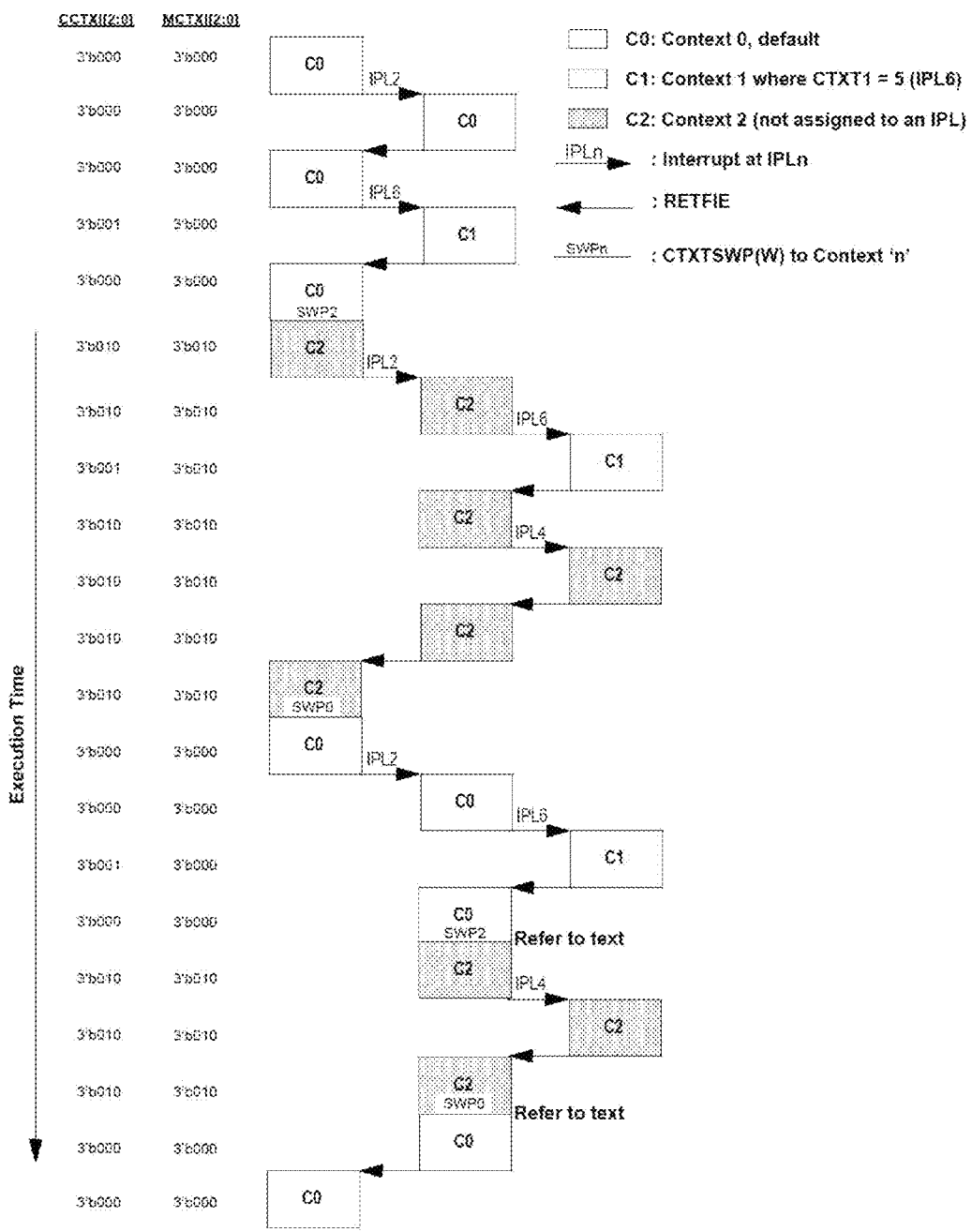
FIG. 8 shows another flow chart depicting exemplary exception processing.

FIG. 8 shows an example of a mixed hardware and manual software context switching. Switching contexts through software (manual switching) is primarily intended to be used as a means to initialize contexts assigned to an IPL (when all interrupts associated with that IPL are disabled). It is expected that the initialization software will return the active context to the default Context 0 (though this is not required, provided the selected context is not used elsewhere in the code). However, it is possible to assign some contexts to hardware switching based on IPLs, and leave others for use with software switching using a CTXTSWP(W) instruction during application run-time execution. The Manual Context Identifier (CTXTSTAT.MCTXI[2:0]) is used to track any manually switched contexts such that, if a RETFIE instruction does not find that the returned (un-stacked) IPL is associated with an alternative context, it will return to the last known manually updated context number held in CTXTSTAT.MCTXI[2:0]. At reset, CTXTSTAT.MCTXI[2:0]=3'b000. As discussed above, it is expected that if software context switching is not used within the application main code, the user should ensure CTXTSTAT.MCTXI[2:0]=3'b000 (default context) after initialization.

Exceptions are not inhibited by the CTXTSWP(W) instructions. Should an exception arrive at the CPU (Q1) of either cycle of CTXTSWP(W) execution, the instruction will complete during the first cycles of exception processing. Should an exception arrive prior to or after the CTXTSWP(W) instruction, exception processing will proceed as normal.

According to another specific embodiment, if the software interlock is satisfied (i.e. nvm_cpu_op_unlock is asserted during cycle 1 of CTXTSWP(W)), the context swap and CXTXSTAT register update will be completed by the time the interrupt or trap handler vector fetch commences. Exception processing will vector as normal and the handler will return to the address following the CTXTSWP(W) instruction. Should the exception be an interrupt at an IPL that is assigned to another context (contexts assigned to CTXTSWP(W) and IPL-based use must be exclusive when used concurrently), then the context will switch again during exception processing. However, the IPL based context change will occur after any software driven context change, so the associated ISR RETFIE instruction will return to the correct context (i.e. the one just selected by the CTXTSWP(W) instruction).

According to yet another embodiment, if the software interlock is not satisfied, CTXTSWP(W) will execute as a 2~FNOP and the context will not change. Exception processing will vector as normal and the handler will return to the address following the CTXTSWP(W) instruction.

The CPU according to this specific embodiment can support between 0 and 4 additional CPU register contexts. A CPU register context as shown in FIG. 3 is defined as WREG0 through WREG14. No other CPU registers are included in the additional contexts. Context switching is achieved either during exception processing and RETFIE, or through execution of a CTXTSWP(W) instruction.

The CTXTSWP(W) instructions will switch to the context defined in the instruction operand in 2 cycles. The new context will be immediately available at the start of execution of the next instruction. The CTXTSWP(W) instructions will also update the CTXTSTAT.MCTXI[2:0] register field with the newly selected context value.

There are some usage considerations with regards to the CTXTSWP(W) instructions according to a specific embodiment: 1. It should be noted that the SR is not a part of the additional contexts. Consequently, when using CTXTSWP(W) to switch CPU register contexts, users will need to manually save/restore the SRL register. 2. Unlike hardware context switching where the return context is implicitly defined by the stacked CPU IPL value, the CTXTSWP(W) instructions do not save any history. It is therefore the users responsibility to track the CPU contexts when using the CTXTSWP(W) instructions.

After un-stacking the SR (in the 2nd cycle), the RETFIE instruction will examine the un-stacked IPL[2:0] value. If IPL[2:0] is associated with a CPU register context, the return instruction will switch to that context. If IPL[2:0] is not associated with a CPU register context, the return instruction will switch to the context number held in the Manual Context Identifier (CTXTSTAT.MCTXI[2:0]) register field. This in conjunction with exception processing operation ensures context coherency when nesting exceptions and/or calls where contexts are switched both automatically and manually. In both of the cases above, the Current Context Identifier (CTXTSTAT.CCTXI[2:0]) register field is updated accordingly. The state of the Manual Context Identifier (CTXTSTAT.MCTXI[2:0]) register field is not affected. The new context will be immediately available (with no RAW hazard) at the start of execution of the next instruction. The contents of the old context are not affected in any way by the switch.

According to another embodiment, no specific instruction for performing the context switch may be necessary, because in a manual context switch according to some embodiments a context switch is performed by manually setting of the respective bits in the control register. In such an embodiment, the control register must be readable and at least partially writeable. In both methods, no overhead instructions need to be executed to actually save the content of the context registers as for example in a conventional interrupt service routine with overhead.

The various embodiments mentioned can be combined with various features of other embodiments. No feature described in the various embodiments has necessarily an exclusive characteristic unless mentioned in the specification. Thus, a variety of combination of features can be implemented in a processing unit as disclosed in the various embodiments.

What is claimed is:

1. A method for performing a context switch in a central processing unit (CPU) comprising a plurality context defining register sets, wherein each set of registers having the same number of CPU registers; the method comprising:
    upon occurrence of an exception automatically switching to a register set of said plurality of context defining register sets,
    wherein selection of a register set of said plurality of context defining register can further be manually initiated by executing a context switch instruction; and
    indicating a currently used context in a first bitfield and a most recent context selected by said instruction in a second bitfield of a context status register.

2. The method according to claim 1, further comprising executing the context switch instruction thereby initiating a context switch.

3. The method according to claim 2, wherein the context switch instruction is a dedicated context swap instruction.

4. The method according to claim 3, wherein the context status register is only readable.

5. The method according to claim 2, wherein the context status register is readable and at least the second bitfield is writable and the context switch instruction is a move data instruction that is applied to the second bitfield of the context status register for changing the content of the context status register to initiate a context switch.

6. The method according to claim 1, further comprising assigning a plurality of priority levels to a plurality of interrupt sources.

7. The method according to claim 6, wherein each of said plurality of register sets is assignable to an interrupt level such that upon occurrence of an interrupt a respective register set of said plurality of context defining register sets is selected by said switching unit depending on the interrupt level.

8. The method according to claim 7, wherein an unassigned interrupt level defaults to a default register set of said plurality of context defining register sets.

9. The method according to claim 7, wherein upon occurrence of an interrupt with an unassigned interrupt level, the current context defining register set defines the current context.

10. The method according to claim 7, wherein if a register set is assigned to a priority level which has already been assigned to another register set, then the CPU is operable to assign the register set with a lower number to the selected priority level and unassign the respective other register set.

11. The method according to claim 7, further comprising providing a fuse field for assigning said interrupt levels to one of said plurality of register sets.

12. The method according to claim 1, further comprising updating the context status register with a new context in the first bitfield after a context switch has been performed.

13. The method according to claim 1, wherein the context switch instruction comprises a literal which identifies a chosen context.

14. The method according to claim 1, wherein the context switch instruction identifies a register which stores information identifying a chosen context.

15. A central processing unit (CPU) comprising:
    an interrupt unit for interrupting execution of instructions;
    a plurality of context defining register sets, wherein each set of registers having the same number of CPU registers;
    a switching unit configured to couple one of the plurality of context defining register sets within the CPU, wherein the switching unit switches to a predetermined register set of said plurality of context defining register sets upon occurrence of an exception or upon execution of a context switch instruction; and
    a context status register coupled with the switching unit, wherein the context status register comprises a first bitfield indicating a current context and a second bitfield indicating a most recent context selected by said context switch instruction.

16. The CPU according to claim 15, wherein the context switch instruction is a dedicated context swap instruction.

17. The CPU according to claim 16, wherein the context status register is only readable.

18. The CPU according to claim 15, wherein the context status register is readable and at least the second bitfield is writable and the context switch instruction is a move data instruction that is applied to the second bitfield of the context status register for changing the content of the context status register to initiate a context switch.

19. The CPU according to claim 15, wherein the interrupt unit comprises an interrupt controller operable to assign a plurality of priority levels to a plurality of interrupt sources.

20. The CPU according to claim 19, wherein each of said plurality of register sets is assignable to an interrupt level such that upon occurrence of an interrupt a respective register set of said plurality of context defining register sets is selected by said switching unit depending on the interrupt level.

21. The CPU according to claim 20, wherein an unassigned interrupt level defaults to a default register set of said plurality of context defining register sets.

22. The CPU according to claim 20, wherein upon occurrence of an interrupt with an unassigned interrupt level the current context defining register set defines the current context.

23. The CPU according to claim 20, wherein if a register set is assigned to a priority level which has already been assigned to another register set, then the CPU is operable to assign the register set with a lower number to the selected priority level and unassign the respective other register set.

24. The CPU according to claim 20, further comprising a fuse field for assigning said interrupt levels to one of said plurality of register sets.

25. The CPU according to claim 15, wherein the context status register is updated with a new context after a context switch has been performed.

26. The CPU according to claim 15, wherein the context switch instruction comprises a literal which identifies a chosen context.

27. The CPU according to claim 15, wherein the context switch instruction identifies a register which stores information identifying a chosen context.

\* \* \* \* \*